June 4, 1935.                F. TINTNER                2,003,844
                          FOLDABLE STRETCHER
                         Filed Aug. 14, 1933
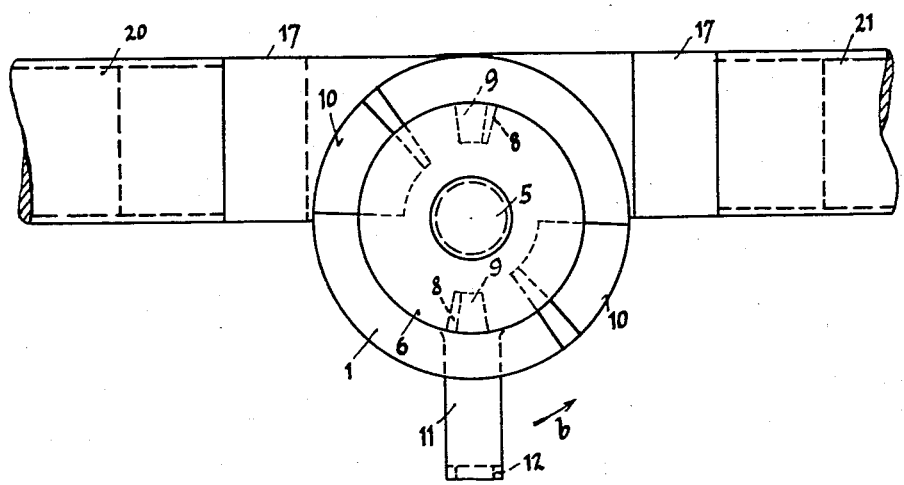
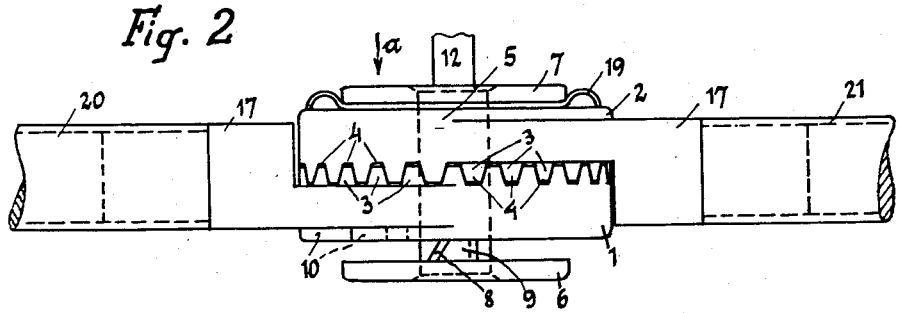
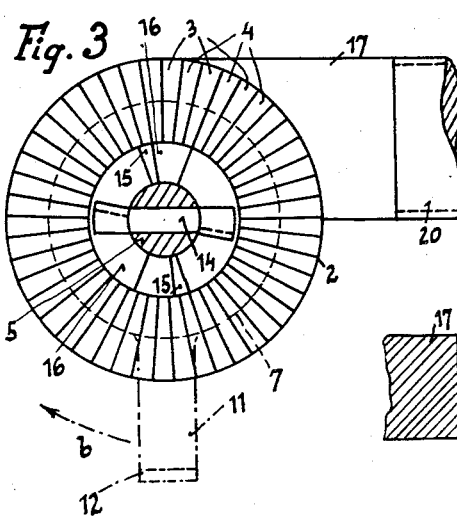
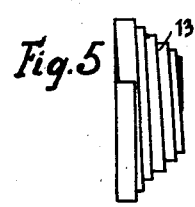
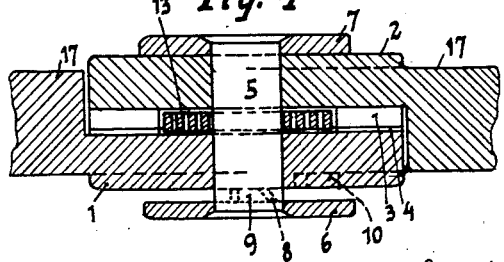

Patented June 4, 1935

2,003,844

UNITED STATES PATENT OFFICE 2,003,844

FOLDABLE STRETCHER

Fritz Tintner, Vienna, Austria

Application August 14, 1933, Serial No. 685,071
In Austria August 26, 1932

2 Claims. (Cl. 287—14)

This invention relates to a foldable stretcher which is intended for supporting and transporting sick and injured persons and differs from similar stretchers in that, on the one hand, the cheeks of the stretcher joints have opposite radial teeth and one or more projections are arranged on the joint bolts preventing the teeth from disengaging as long as the projections are not opposite recesses provided in the joint cheeks, and, on the other hand, the pivotally mounted handles serving as feet are fixed in position by resilient pins engaging in bores, the middle foot being of bow shape and the head support held in the position for use and in the folded position by a spring bent in S-shape.

Two embodiments of the invention are illustrated by way of example in the accompanying drawing in which:—

Fig. 1 shows the stretcher joint in front elevation.

Fig. 2 is a top plan view of Fig. 1.

Fig. 3 shows a joint cheek in elevation.

Fig. 4 is a longitudinal section through a joint of modified construction.

Fig. 5 shows in side elevation the spiral spring employed in the joint according to Fig. 4.

The beams of the stretcher are connected by joints, the cheeks 1 and 2 of which are provided with teeth 3 which can be brought into engagement by pressing together the cheeks 1 and 2. The joint cheeks 1 and 2 are pivotally mounted on bolts 5 on which discs 6 and 7 are fixed at a sufficient distance apart to allow the cheeks to be turned when the teeth 3 are disengaged. The disc 6 has two projections 9 provided with inclined side faces 8 and prevents the teeth 3 from disengaging as long as these projections 9 are out of the range of recesses 10 provided in the outer side of the joint cheek 1 (Figs. 1 and 2). The disc 7 has an arm 11 with the aid of which it can be turned in the direction of the arrow *b* together with the bolt 5 and the disc 6 until the projections 9 enter in the recesses 10. Two opposite arms 11 of the stretcher are interconnected by transverse elements 12 so that both discs 7 can only be jointly actuated. In order to automatically move apart the joint cheeks 1, 2, either a conical spiral spring 13 may be arranged between them (Fig. 4), or a pin 14 (Fig. 3) is fixed on the bolt 5 so that during the rotation of the bolt 5 the ends of the pin sliding over the inclined side faces 15 of an insert 16, force the joint cheeks 1, 2 so far apart that the teeth 3, 3 thereof disengage, when the discs 6, 7 can be mutually rotated. The stretcher beam parts 20, 21 for example are fixed on arms 17 of the joint cheeks 1 and 2. Spring washers 19 (Fig. 2) prevent the joints from rattling.

I claim:—

1. A hinge joint especially for foldable stretchers, comprising in combination two cheeks, radial teeth arranged in a circle on the adjacent sides of said cheeks, one of said cheeks provided with recesses on its outer side, a bolt loosely connecting said cheeks, two discs one on each end of said bolt, and projections on one of said discs adapted to normally press together said cheeks to maintain said teeth in engagement and to enter the recesses in said cheeks to allow said cheeks to move apart and disengage said teeth.

2. A hinge joint especially for foldable stretchers, comprising in combination two cheeks, radial teeth arranged in a circle on the adjacent sides of said cheeks, one of said cheeks provided with recesses on its outer side, a bolt loosely connecting said cheeks, two discs one on each end of said bolt, projections on one of said discs adapted to normally press together said cheeks to maintain said teeth in engagement and to enter the recesses in said cheeks to allow said cheeks to move apart and disengage said teeth, inserts in one of said cheeks within the circle of teeth, said inserts having inclined faces, and a pin extending through said bolt between said cheeks adapted to slide on the inclined faces of said inserts to move apart said cheeks to disengage said teeth.

FRITZ TINTNER.